United States Patent
Sampei et al.

(10) Patent No.: US 12,091,578 B2
(45) Date of Patent: Sep. 17, 2024

(54) CLEAR-COATED STAINLESS STEEL SHEET

(71) Applicant: NIPPON STEEL Stainless Steel Corporation, Tokyo (JP)

(72) Inventors: Satoshi Sampei, Tokyo (JP); Nobuhiko Hiraide, Tokyo (JP); Tooru Matsuhashi, Tokyo (JP); Eiichiro Ishimaru, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 422 days.

(21) Appl. No.: 17/422,990

(22) PCT Filed: Mar. 27, 2020

(86) PCT No.: PCT/JP2020/014176
§ 371 (c)(1),
(2) Date: Jul. 14, 2021

(87) PCT Pub. No.: WO2020/196870
PCT Pub. Date: Oct. 1, 2020

(65) Prior Publication Data
US 2022/0073761 A1    Mar. 10, 2022

(30) Foreign Application Priority Data
Mar. 28, 2019   (JP) ................. 2019-063335

(51) Int. Cl.
C09D 5/16      (2006.01)
B05D 7/14      (2006.01)
C09D 7/63      (2018.01)

(52) U.S. Cl.
CPC ............. *C09D 5/1681* (2013.01); *B05D 7/14* (2013.01); *C09D 7/63* (2018.01); *B05D 2202/15* (2013.01); *B05D 2602/00* (2013.01)

(58) Field of Classification Search
None
See application file for complete search history.

(56) References Cited

U.S. PATENT DOCUMENTS 8,968,881 B2 * 3/2015 Furukawa ............ B05D 7/5323
427/8

FOREIGN PATENT DOCUMENTS

| CN | 1538909 A | 10/2004 |
|---|---|---|
| CN | 101098988 A | 1/2008 |
| CN | 201287492 Y | 8/2009 |
| CN | 104870183 A | 8/2015 |
| CN | 105014834 A | 11/2015 |
| CN | 105189108 A | 12/2015 |
| CN | 107633896 A | 1/2018 |
| CN | 108997931 A | 12/2018 |
| CN | 109388017 A | 2/2019 |
| JP | 5-98472 A | 4/1993 |
| JP | 10-43078 A | 2/1998 |
| JP | 10-46989 A | 2/1998 |
| JP | 10-220187 A | 8/1998 |
| JP | 11-10795 A | 1/1999 |
| JP | 2000252503 A * | 9/2000 |
| JP | 2005-343016 A | 12/2005 |
| JP | 2007-114563 A | 5/2007 |
| JP | 4027848 B2 | 12/2007 |
| JP | 2015-44300 A | 3/2015 |
| JP | 2017148950 A * | 8/2017 |
| JP | 2019-6036 A | 1/2019 |
| WO | WO 2018/016617 A1 | 1/2018 |

OTHER PUBLICATIONS

Tawada et al., JP 2000252503, Sep. 14, 2000 (machine translation) (Year: 2000).*
Takahashi et al., JP 2017148950, Aug. 31, 2017 (machine translation) (Year: 2017).*
International Search Report, issued in PCT/JP2020/014176, dated Apr. 21, 2020.
Chinese Office Action and Search Report for corresponding Chinese Application No. 202080007656.X, dated Aug. 25, 2022, with English translation.
Korean Office Action for Korean Application No. 10-2021-7020241, dated Oct. 4, 2023, with an English translation.

* cited by examiner

*Primary Examiner* — Cheng Yuan Huang
(74) *Attorney, Agent, or Firm* — Birch, Stewart, Kolasch & Birch, LLP

(57) ABSTRACT

This clear-coated stainless steel sheet (10) includes a stainless steel sheet (20), and a clear-coated film (30) formed on at least one surface (20*a*) of the stainless steel sheet (20) and having an average film thickness of 0.05 μm or more and 3.00 μm or less.

4 Claims, 1 Drawing Sheet

CLEAR-COATED STAINLESS STEEL SHEET

TECHNICAL FIELD

The present invention relates to a clear-coated stainless steel sheet having corrosion resistance.

The present application claims priority on Japanese Patent Application No. 2019-63335 filed on Mar. 28, 2019, the content of which is incorporated herein by reference.

BACKGROUND ART

Due to the demand for maintenance-free operation in the industrial world, stainless steel sheets having excellent corrosion resistance and appearance are used as outdoor building materials such as exterior wall materials and roofing materials.

Ferritic stainless steel typified by 445J1 is used in stainless steel sheets for outdoor use.

Iron powder may adhere to stainless steel sheets exposed to the outdoors. Even though stainless steel sheets belong to a steel type having high corrosion resistance, in a case where iron powder adheres to the stainless steel sheets, initial rust such as rust stains caused by the iron powder may be generated and the appearance may be deteriorated. As a method of preventing deterioration of the appearance due to initial rust without impairing the appearance of the stainless steel sheets, it is generally known to apply a clear coat on the surface of a stainless steel sheet.

As a method of improving corrosion resistance of a clear-coated stainless steel sheet to which a clear coat is applied, a method of adding an anti-atmospheric-corrosion pigment to a clear coating material is known (for example, Patent Document 1). The method using an anti-atmospheric-corrosion pigment is an effective method for general coating materials. However, transparency of the anti-atmospheric-corrosion pigment itself is low. Therefore, in a case where the anti-atmospheric-corrosion pigment is added to the clear coating material, the obtained clear-coated film has a turbid or a cloudy appearance. As a result, the characteristics of high design that takes advantage of the appearance of the surface of the stainless steel sheet are impaired. In addition, in a case where the iron powder adheres to the clear-coated film regardless of the presence or absence of the anti-atmospheric-corrosion pigment, initial rust due to the iron powder is generated, causing the appearance of the surface of the clear-coated stainless steel sheet to be impaired.

In order to prevent the iron powder from adhering to a coated stainless steel sheet, the sheet is coated to prevent fingerprints and stains (for example, see Patent Document 2). However, the coated stainless steel sheet disclosed in Patent Document 2 is easily wetted with water since a contact angle between a surface of a coated film and water is less than 60°. Therefore, in the coated stainless steel sheet of Patent Document 2, there is a concern that water stays on the coated film and permeates into the coated film; and thereby, corrosion resistance is deteriorated.

PRIOR ART DOCUMENTS

Patent Document

Patent Document 1: Japanese Patent No. 4027848
Patent Document 2: Japanese Unexamined Patent Application, First Publication No. H11-10795

DISCLOSURE OF INVENTION

Problems to be Solved by the Invention

The present invention has been made to solve such a problem, and an object of the present invention is to provide a clear-coated stainless steel sheet having excellent design properties and excellent initial atmospheric corrosion resistance.

Solutions for Solving the Problems

The present invention includes the following aspects.

[1] A clear-coated stainless steel sheet, including: a stainless steel sheet; and a clear-coated film formed on at least one surface of the stainless steel sheet and having an average film thickness of 0.05 µm or more and 3.00 µm or less.

[2] The clear-coated stainless steel sheet according to [1], in which a surface of the clear-coated film is an uneven surface, an interval between two adjacent protruding portions on the uneven surface is 50 µm or more and 500 µm or less, and a height difference between a protruding portion and a recessed portion adjacent to each other on the uneven surface is 2.00 µm or less.

[3] The clear-coated stainless steel sheet according to [1] or [2], in which a contact angle between a surface of the clear-coated film and pure water, a halide aqueous solution, or seawater is 90° or more.

[4] The clear-coated stainless steel sheet according to any one of [1] to [3], in which the clear-coated film contains organic particles.

Effects of Invention

According to the present invention, it is possible to provide a clear-coated stainless steel sheet having excellent design properties and excellent initial atmospheric corrosion resistance.

EMBODIMENTS FOR CARRYING OUT THE INVENTION

Hereinafter, an embodiment of a clear-coated stainless steel sheet of the present invention will be described.

[Clear-Coated Stainless Steel Sheet]

Figure 1:
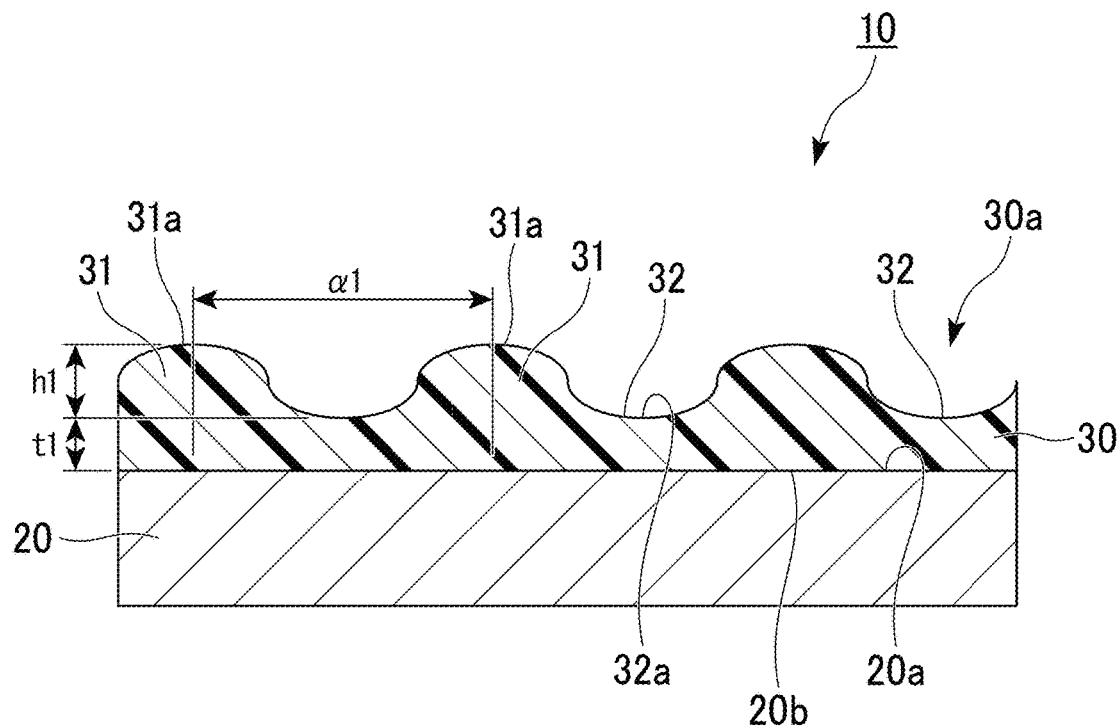
FIG. 1 is a cross-sectional view showing a schematic configuration of an embodiment of a clear-coated stainless steel sheet of the present invention.

FIG. 1 is a cross-sectional view showing a schematic configuration of an embodiment of a clear-coated stainless steel sheet of the present embodiment.

As shown in FIG. 1, a clear-coated stainless steel sheet 10 of the present embodiment includes a stainless steel sheet 20 and a clear-coated film 30 formed on one surface 20a of the stainless steel sheet 20.

"Stainless Steel Sheet"

The kinds of the stainless steel sheet 20 are not particularly limited, and examples thereof include steel sheets made of SUS430, SUS430LX, SUS304, SUS316, SUS317J, SUS445J1, SUS445J2, SUS447J1, and the like. Among these, for outdoor use, steel sheets made of SUS445J1, SUS445J2, SUS447J1, and the like, which are high Cr and high Mo-added ferritic stainless steel sheets, are preferable. Such high Cr and high Mo-added ferritic stainless steel sheets have often been used for large roofs in recent years because high Cr and high Mo-added ferritic stainless steel sheets have less thermal expansion than SUS304, SUS316, and SUS317J, which are austenitic stainless steel sheets having excellent corrosion resistance, and duplex stainless steel sheets having excellent corrosion resistance.

Furthermore, as ferritic stainless steel sheets, a stainless steel sheet including, in terms of % by mass, C: 0.001% to 0.03%, Si: 0.01% to 1%, Mn: 0.01% to 1.5%, P: 0.005% to 0.05%, S: 0.0001% to 0.01%, Cr: 11% to 30%, N: 0.001% to 0.03%, and Al: 0.005% to 1%, with a remainder being Fe and impurities is desirable. As necessary, this stainless steel sheet can contain one or more kinds selected from Sn: 0.01% to 1%, Nb: 0.03% to 0.5%, Ti: 0.03% to 0.5%, Ni: 0.1% to 0.5%, Cu: 0.1% to 0.5%, Mo: 0.1% to 0.5%, V: 0.01% to 0.5%, Zr: 0.01% to 0.5%, Co: 0.01% to 0.5%, Mg: 0.0001% to 0.005%, B: 0.0003% to 0.005%, Ca: 0.005% or less, La: 0.001% to 0.1%, Y: 0.001% to 0.1%, Hf: 0.001% to 0.1%, and REM: 0.001% to 0.1% in terms of % by mass, instead of a part of Fe.

Surface finishes of the one surface 20a and another surface 20b of the stainless steel sheet 20 are not particularly limited, and for example, the surfaces are set to be in the state specified by surface finish symbols such as No. 2B, No. 2D, HL, and the like in JIS G 4305:2015.

A thickness of the stainless steel sheet 20 is not particularly limited, but, for example, is preferably 0.1 mm or more and 10.0 mm or less in the use of outdoor building materials such as roofing materials.

"Clear-Coated Film"

An average film thickness of the clear-coated film 30 is 0.05 μm or more and 3.00 μm or less. The average film thickness is preferably 0.10 μm or more, 0.50 μm or more, or 1.00 μm or more. In addition, the average film thickness is more preferably 2.50 μm or less or 1.50 μm or less.

In a case where the average film thickness of the clear-coated film 30 is less than 0.05 μm, a portion where the clear-coated film 30 is not formed due to unevenness on the one surface 20a of the stainless steel sheet 20 exists, and the effect of improving the corrosion resistance of the clear-coated film 30 is not exhibited.

On the other hand, in a case where the average film thickness of the clear-coated film 30 is more than 3.00 μm, a color tone of the clear-coated film 30 becomes white (turbidity), causing the appearance of the clear-coated stainless steel sheet to be impaired.

As shown in FIG. 1, in the clear-coated film 30, a surface opposite to the surface in contact with the stainless steel sheet 20 is referred to as a surface 30a of the clear-coated film 30. The surface 30a of the clear-coated film 30 is an uneven surface. That is, the surface 30a of the clear-coated film 30 is an uneven surface including a plurality of protruding portions 31 and recessed portions 32.

The average film thickness of the clear-coated film 30 having the uneven surface is measured by observing a cross-section of the clear-coated stainless steel sheet 10 in a thickness direction with a scanning electron microscope (SEM). In the clear-coated film 30, a distance t1 from a deepest point 32a of the recessed portion 32 to the one surface 20a of the stainless steel sheet 20 is measured at three points, and an average value of the measured values at these three points is set as the average film thickness of the clear-coated film 30.

On the uneven surface of the surface 30a of the clear-coated film 30, an interval d1 between the two adjacent protruding portions 31, that is, the interval d1 between vertices (highest points of the protruding portions 31) 31a of the two adjacent protruding portions 31 is preferably 50 μm or more and 500 μm or less. The interval d1 is preferably 100 μm or more, or 200 μm or more. In addition, the interval d1 is more preferably 450 μm or less, or 400 μm or less.

In a case where the interval d1 between the two adjacent protruding portions 31 is within the above-described range, the deterioration of the clear-coated film 30 due to salt precipitation described later can be prevented. In addition, in a case where the interval d1 between the two adjacent protruding portions 31 is more than 500 μm, the color tone of the surface of the clear-coated film 30 is uneven, causing the appearance to be impaired.

Figure 2:
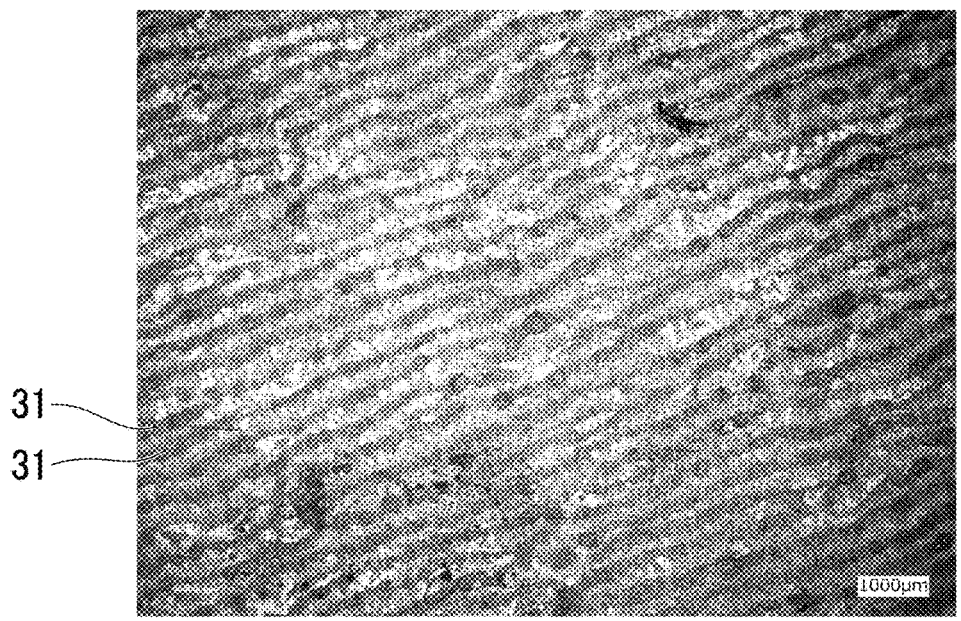
FIG. 2 is a scanning electron microscope image of a surface of a clear-coated film in the embodiment of the clear-coated stainless steel sheet of the present invention.

FIG. 2 shows a scanning electron microscope image of the surface 30a of the clear-coated film 30.

The interval d1 between the two adjacent protruding portions 31 on the surface 30a of the clear-coated film 30 is measured as follows: the surface 30a of the clear-coated film 30 is observed using a microscope (VHX-5000 manufactured by KEYENCE CORPORATION), a distance between two points is measured at three points by software attached to the microscope, and an average value thereof is calculated.

In the above-described uneven surface, a height difference h1 between the protruding portion 31 and the recessed portion 32 adjacent to each other, that is, a height difference h1 between the vertex 31a of the protruding portion 31 and the deepest point 32a of the recessed portion 32 is preferably 2.00 μm or less. The height difference h1 is more preferably 1.80 μm or less, 1.50 μm or less, 1.20 μm or less, or 1.00 μm or less. The lower limit is not particularly limited, but may be, for example, 0.01 μm or more or 0.03 μm or more.

In a case where the height difference h1 between the protruding portion 31 and the recessed portion 32 adjacent to each other is within the above-described range, the deterioration of the clear-coated film 30 due to salt precipitation described later can be prevented. In addition, in a case where the height difference h1 between the protruding portion 31 and the recessed portion 32 adjacent to each other is more than 2.00 μm, the color tone of the surface of the clear-coated film 30 is uneven, causing the appearance to be impaired.

The height difference h1 between the protruding portion 31 and the recessed portion 32 adjacent to each other, that is, the height difference h1 between the vertex 31a of the protruding portion 31 and the deepest point 32a of the recessed portion 32 is measured by observation with a scanning electron microscope (SEM). In the clear-coated film 30, the height difference h1 is determined as follows: a distance t2 from the deepest point 32a of the recessed portion 32 to the vertices 31a (highest points of the protruding portions 31) of two adjacent protruding portions 31 is measured at three points, and an average value of the measured values at the three points is set as the height difference h1 between the protruding portion 31 and the recessed portion 32 adjacent to each other.

A contact angle between the surface 30a of the clear-coated film 30 and either one of pure water, a halide aqueous solution, or seawater is preferably 90° or more. The contact angle is more preferably 95° or more or 100° or more.

In a case where the contact angle between the surface 30a of the clear-coated film 30 and either one of pure water, a halide aqueous solution, or seawater is 90° or more, droplets of pure water, a halide aqueous solution, or seawater are not deposited on the surface 30a of the clear-coated film 30, and deterioration of the clear-coated film 30 due to salt precipitation described later can be prevented.

The contact angle between the surface 30a of the clear-coated film 30 and either one of pure water, a halide aqueous solution, or seawater is measured using a contact angle meter at 25° C. The contact angle is measured at 10 locations on the surface 30a of the clear-coated film 30, and an average value thereof is set as the contact angle of the surface 30a of the clear-coated film 30. In measurement principle, the contact angle changes depending on the surface tension of a solution used for the measurement. In the present invention, the contact angle is measured with pure water because the contact angle is affected more by a film thickness and an uneven shape than a change in the surface tension of a halide aqueous solution or seawater. That is, since a measured value of a contact angle with a halide aqueous solution or seawater is almost the same as a measured value of a contact angle with pure water, the measured value of the contact angle with a halide aqueous solution or seawater can be replaced with the measured value of the contact angle with pure water.

Next, regarding the above-described unevenness, the reason for limiting the interval d1 between the two adjacent protruding portions 31 and the height difference h1 between the protruding portion 31 and the recessed portion 32 adjacent to each other will be described.

Generally, a clear-coated film has hydrophobicity. Therefore, the surface of a clear-coated film exhibits water repellency to water and an aqueous solution. Furthermore, the water repellency of a clear-coated film improves as the unevenness of a coating surface increases, that is, as the roughness of the coating surface increases.

In the clear-coated stainless steel sheet 10 of the present embodiment, the larger the height difference h1 between the protruding portion 31 and the recessed portion 32 adjacent to each other on the surface 30a of the clear-coated film 30, the better the water repellency. Regarding the initial atmospheric corrosion resistance and water repellency, which are important characteristics of the clear-coated stainless steel sheet 10 of the present embodiment, as the water repellency increases, adhesion of an aqueous solution to the stainless steel sheet 20 decreases, and deterioration of the clear-coated film 30 is suppressed. The deterioration of the clear-coated film 30 causes the aqueous solution to reach the stainless steel sheet 20 easily and accelerates corrosion of the stainless steel sheet 20. Therefore, the improvement of the water repellency of the clear-coated film 30 is effective in improving the initial atmospheric corrosion resistance. In addition, regarding rust stains caused by iron powder or the like, as the water repellency increases, adhesion of the iron powder can be suppressed by a washing-out effect. Therefore, the improvement of the water repellency is effective against initial rust caused by rust stains. In addition, the present inventors found that the criticality of water repellency is exhibited when the contact angle between the surface 30a of the clear-coated film 30 and either one of pure water, a halide aqueous solution, or seawater is 90° or more.

On the other hand, from the viewpoint of improving the corrosion resistance of the clear-coated stainless steel sheet, an aqueous solution containing chloride ions, such as seawater and condensed water, is considered to be the most severe corrosive environment. Salts such as sodium chloride (NaCl) are produced from seawater as a result of evaporation, and these salts enter the uneven surface of the clear-coated film and accelerate the deterioration of the clear-coated film.

Therefore, in the clear-coated stainless steel sheet 10 of the present embodiment, in order to prevent the deterioration of the clear-coated film 30 due to salt precipitation, the interval d1 between the two adjacent protruding portions 31 and the height difference h1 between the protruding portions 31 and the recessed portion 32 adjacent to each other are specified in the above-described ranges.

A resin component of the clear-coated film 30 is not particularly limited, but resins contained in transparent coating materials widely used for exterior building materials such as fluorine, urethane, silicone, silicone polyester, and acrylic resin can be used. The coating material used for forming the clear-coated film 30 may be either an aqueous-based material or an organic solvent-based material.

The clear-coated film 30 may contain organic particles. In other words, the organic particles may be dispersed in the clear-coated film 30.

The size, amount, and kind of the organic particles are not particularly limited as long as the transparency of the clear-coated film 30 is not greatly impaired.

Examples of the organic particles preferably used in the present embodiment include waxes and metal soaps used as lubricants.

Examples of the waxes include polyethylene wax, carnauba wax, paraffin wax, polytetrafluoroethylene wax, and the like.

Examples of the metal soaps include stearate, oleate, laurate, dodecylbenzenesulfonate, and the like.

Organic particles other than the above-described waxes and metal soaps can also be used.

In addition, one kind of the organic particles may be used alone, or two or more kinds thereof may be mixed and used.

The amount of the organic particles in the clear-coated film 30 is not particularly limited, and is appropriately adjusted according to the resin component of the clear-coated film 30, and the like.

In a case where the clear-coated film 30 contains the above-described organic particles, the corrosion resistance of the clear-coated film 30 is improved.

The clear-coated film 30 may contain pigments such as silicon oxide, titanium oxide, or the like for the purpose of imparting design properties, in addition to the organic particles. In a case where an excessive amount of these pigments is contained in the clear-coated film 30, the appearance unique to stainless steel sheets may be impaired. In addition, even in a case where the clear-coated film 30 contains a small amount of pigments to the extent that the appearance is not impaired, the appearance may be deteriorated due to whitening called chalking during use. Therefore, the amount of the pigments in the clear-coated film 30 is set to be in a range in which chalking does not occur. In a case where a used area is large, such as roofs and exterior materials used in a large structure, and chalking occurs, causing deterioration of the appearance, enormous repair costs may be incurred. Therefore, the adjustment of the amount of the pigment is important.

"Method of Manufacturing Clear-Coated Stainless Steel Sheet"

The method of manufacturing a clear-coated stainless steel sheet of the present embodiment includes, for example, a step of adjusting a coating material, a step of coating the above described coating material on the one surface 20a of the dull-finished stainless steel sheet 20 to form a coated film, and a step of drying and curing the coated film to form the clear-coated film 30 on the one surface 20a of the stainless steel sheet 20. The coating material includes a solution containing the resin component of the clear-coated film 30 or a resin liquid that is an emulsion. The clear-coated stainless steel sheet of the present embodiment is manufactured by this method of manufacturing a clear-coated stainless steel sheet.

The above-described coating material may contain the above-described organic particles.

By adjusting the amount of the organic particles with respect to a resin solid amount contained in the coating material, the amount of the organic particles with respect to the resin for forming the clear-coated film 30 can be adjusted.

In a case where the coating material contains the above-described organic particles, it is preferable to sufficiently disperse the organic particles in the coating material by an appropriate stirring method before the one surface 20a of the stainless steel sheet 20 is coated with the coating material.

A method of coating the coating material on the one surface 20a of the stainless steel sheet 20 is not particularly limited. Examples of the coating method include a method in which a predetermined film thickness can be obtained by using a roll coater, a bar coater, a spray, a curtain flow coater, a brush, or the like. With these coating methods, the coating material is applied to the one surface 20a of the stainless steel sheet 20 and then dried at room temperature or dried in an oven, a heating furnace, or the like to form the clear-coated film 30. As necessary, baking may be performed. In a case of precisely controlling the uneven surface shape of the surface 30a of the clear-coated film 30, it is effective to use a roll coater, a bar coater, or the like.

For example, in a case of applying the coating material to the stainless steel sheet 20 using a bar coater or a roll coater, the interval between two adjacent protruding portions and the height difference between the protruding portion and the recessed portion adjacent to each other can be adjusted by changing an application speed. In a case where the application speed is increased, the interval between the two adjacent protruding portions can be widened, and the height difference between the protruding portion and the recessed portion adjacent to each other can be increased. Furthermore, it is possible to adjust the interval between the two adjacent protruding portions and the height difference between the protruding portion and the recessed portion adjacent to each other by repeatedly applying the coating material.

As shown in FIG. 1, in the clear-coated stainless steel sheet 10 of the present embodiment, the case where the clear-coated film 30 is formed only on the one surface 20a of the stainless steel sheet 20 directed toward the outer surface is exemplified, but the form of the clear-coated stainless steel sheet 10 of the present embodiment is not limited thereto. The clear-coated stainless steel sheet 10 of the embodiment may include the clear-coated film 30 formed on both the one surface 20a and the other surface 20b of the stainless steel sheet 20. In a case where the clear-coated film 30 is formed only on the one surface 20a of the stainless steel sheet 20, the film may not be formed on the other surface 20b of the stainless steel sheet 20, or an appropriate film other than the clear-coated film, for example, a transparent resin film containing no organic particles or a colored resin film containing a coloring pigment may be formed.

Although a base treatment of the stainless steel sheet is not essential; one is generally adopted for coating of a metal sheet because corrosion resistance and adhesion to the coated film can be improved by the base treatment. In the clear-coated stainless steel sheet 10 of the present embodiment, the one surface 20a and the other surface 20b of the stainless steel sheet 20 are subjected to a chromate treatment or a chrome-free base treatment. Thereby, the adhesion between the stainless steel sheet 20 and the clear-coated film 30 can be improved in addition to the improvement of the corrosion resistance of the stainless steel sheet 20.

According to the clear-coated stainless steel sheet of the present embodiment, it is possible to improve the design properties and the initial atmospheric corrosion resistance in the use of outdoor building materials such as roofing materials and the like.

Examples

In order to confirm the effect of the present invention in detail, the following experiment was carried out. This Example shows one Invention Example, and the present invention is not limited to the following configuration.

Experimental Examples

As a stainless steel sheet, a 2B product of SUS304 having a sheet thickness of 1.0 mm was used.

A commercially available acrylic coating material (trade name: acrylic cracker ECO transparent clear, manufactured by SUNDAY PAINT CO., LTD.) was applied to one surface of the stainless steel sheet.

Regarding the application of the acrylic coating material, a bar coater and a roll coater were used to form a coated film so as to have an average film thickness ($\mu$m) of the clear-coated film, an interval ($\mu$m) between two adjacent protruding portions, and a height difference ($\mu$m) between a protruding portion and a recessed portion adjacent to each other shown in Table 1.

Thereafter, the coated film was baked at 120° C. for 60 seconds to prepare a stainless steel sheet having a clear-coated film (clear-coated stainless steel sheet).

In Table 1, No. A1 to No. A9 are clear-coated stainless steel sheets of Examples of the present invention, each of which satisfies all conditions in which an average film thickness of the clear-coated film is 0.05 $\mu$m or more and 3.00 $\mu$m or less, an interval between two adjacent protruding portions on the uneven surface of the clear-coated film is 50 $\mu$m or more and 500 $\mu$m or less, a height difference between a protruding portion and a recessed portion adjacent to each other on the uneven surface of the clear-coated film is 2.00 $\mu$m or less, and a contact angle between the surface of the clear-coated film and pure water is 90° or more.

In addition, in Table 1, No. B1 to No. B11, and No. C1 to No. C9 are clear-coated stainless steel sheets of Comparative Examples of the present invention, each of which does not satisfy at least one condition in which an average film thickness of the clear-coated film is 0.05 $\mu$m or more and 3.00 $\mu$m or less, an interval between two adjacent protruding portions on the uneven surface of the clear-coated film is 50 $\mu$m or more and 500 $\mu$m or less, a height difference between a protruding portion and a recessed portion adjacent to each other on the uneven surface of the clear-coated film is 2.00 µm or less, or a contact angle between the surface of the clear-coated film and pure water is 90° or more.

During the application of the acrylic coating material using a bar coater or a roll coater, the interval between two adjacent protruding portions and the height difference between the protruding portion and the recessed portion adjacent to each other can be adjusted by changing an application speed. In a case where the application speed is increased, the interval between the two adjacent protruding portions can be widened, and the height difference between the protruding portion and the recessed portion adjacent to each other can be increased. Furthermore, it is possible to adjust the interval between the two adjacent protruding portions and the height difference between the protruding portion and the recessed portion adjacent to each other by repeatedly applying the acrylic coating material.

Evaluation

With regard to each of the clear-coated stainless steel sheets obtained in No. A1 to No. A9, No. B1 to No. B11, and No. C1 to No. C9, an "average film thickness of a clear-coated film", an "interval between two adjacent protruding portions", a "height difference between a protruding portion and a recessed portion adjacent to each other", a "contact angle (water repellency)", and "corrosion resistance" were evaluated.

(Average Film Thickness of Clear-Coated Film)

The average film thickness of the clear-coated film was measured by observing a cross-section of the clear-coated stainless steel sheet in a thickness direction with a scanning electron microscope (trade name: JSM-6490A, manufactured by JEOL Ltd.). In the clear-coated film, a distance from a deepest point of the recessed portion to one surface of the stainless steel sheet was measured at three points, and an average value of the measured values at these three points was set as the average film thickness of the clear-coated film.

A case where the average film thickness was less than 0.05 µm was determined as unacceptable since the corrosion resistance deteriorated. In addition, a case where the average film thickness was more than 3.00 µm was determined as unacceptable since the turbidity of the clear-coated film was noticeable. A case where the average film thickness was in a range of 2.00 to 3.00 µm was determined as acceptable in a comprehensive determination since the clear-coated film was slightly turbid, but there was no problem in practical use. The evaluation results are shown in Table 1.

(Interval Between Two Adjacent Protruding Portions)

The interval between two adjacent protruding portions on the surface of the clear-coated film was measured by observing the surface of the clear-coated film using a microscope (trade name: VHX-5000, manufactured by KEYENCE CORPORATION). Then, the interval was measured as follows: a distance between two points was measured at three points using software attached to the microscope, and an average value thereof was calculated.

A case where the interval between the two adjacent protruding portions was less than 50 µm was determined as unacceptable since NaCl in a chloride aqueous solution was precipitated, the clear-coated film was destroyed, the clear-coated film was deteriorated, and the corrosion resistance was deteriorated. In addition, a case where the interval between the two adjacent protruding portions was more than 500 µm was determined as unacceptable since the color tone of the clear-coated film after heat treatment described later was uneven, and the appearance of the clear-coated stainless steel sheet was impaired. The evaluation results are shown in Table 1.

(Height Difference Between Protruding Portion and Recessed Portion Adjacent to Each Other)

The height difference between a protruding portion and a recessed portion adjacent to each other on the surface of the clear-coated film was measured by observing the surface of the clear-coated film using a scanning electron microscope (trade name: JSM-6490A, manufactured by JEOL Ltd.). In the clear-coated film, the height difference was determined as follows: a distance from the deepest point of the recessed portion to vertices (highest points of the protruding portions) of two adjacent protruding portions was measured at three points, and an average value of the measured values at the three points was set as the height difference between the protruding portion 31 and the recessed portion 32 adjacent to each other.

A case where the height difference between the protruding portion and the recessed portion adjacent to each other was more than 2 µm was determined as unacceptable since the color tone of the clear-coated film after the heat treatment described later was uneven, and the appearance of the clear-coated stainless steel sheet was impaired. The evaluation results are shown in Table 1.

(Contact Angle)

1.8 µL of pure water was added dropwise onto the surface of the clear-coated film, and a contact angle between the surface of the clear-coated film and pure water was measured with a contact angle meter (trade name: DMs-401, manufactured by Kyowa Interface Science Co., Ltd.) at 25° C. The contact angle was measured at 10 locations on the surface of the clear-coated film, and an average value thereof was set as the contact angle of the surface of the clear-coated film.

A case where the contact angle was less than 90° was determined as unacceptable since droplets of pure water stayed on the surface of the clear-coated film, causing accelerated deterioration of the clear-coated film and deterioration of the corrosion resistance of the clear-coated stainless steel sheet. The evaluation results are shown in Table 1.

(Corrosion Resistance)

The corrosion resistance of each of the clear-coated stainless steel sheets obtained in No. A1 to No. A9, No. B1 to No. B11, and No. C1 to No. C9 was evaluated.

Regarding the corrosion resistance of the clear-coated stainless steel sheet, a dry-wet corrosion test based on JASO-M609 was performed for 50 cycles, and the appearance of the clear-coated stainless steel sheet after the test was visually observed. A rusted portion and a normal portion (non-corroded portion) were binarized, and an area ratio of the rusted portion was determined by image processing. Acceptable "O" was given in a case where the area ratio of the rusted portion on the surface of the clear-coated stainless steel sheet was less than 5%, and unacceptable "X" was given in a case where the area ratio of the rusted portion was 5% or more. The evaluation results are shown in Table 1.

TABLE 1

| No. | | Average film thickness [μm] | Interval between protruding portions [μm] | Height difference between protruding portion and recessed portion [μm] | Contact angle [°] | Corrosion resistance | Transparency | Uneven gloss | Comprehensive determination | Initial atmospheric corrosion resistance |
|---|---|---|---|---|---|---|---|---|---|---|
| B1 | Comparative Example | 0.04 | 845 | 2.48 | 75 | X | Unacceptable | X | X | X |
| B2 | Comparative Example | 0.04 | 20 to 500 | 2 or less | less than 90 | X | Unacceptable | O | X | X |
| B3 | Comparative Example | 0.05 | 26 | 0.05 | 90 | X | Acceptable | O | X | O |
| B4 | Comparative Example | 0.05 | 32 | 1.91 | 91 | X | Acceptable | O | X | O |
| B5 | Comparative Example | 0.05 | 332 | 3.23 | 92 | O | Acceptable | X | X | O |
| B6 | Comparative Example | 0.05 | 712 | 0.05 | 96 | O | Acceptable | X | X | O |
| B7 | Comparative Example | 0.06 | 662 | 1.88 | 91 | O | Acceptable | X | X | O |
| B8 | Comparative Example | 0.07 | 28 | 2.55 | 92 | X | Acceptable | X | X | O |
| B9 | Comparative Example | 0.15 | 33 | 1.85 | 95 | X | Acceptable | O | X | O |
| B10 | Comparative Example | 1.11 | 238 | 3.85 | 93 | O | Acceptable | X | X | O |
| B11 | Comparative Example | 1.90 | 678 | 3.34 | 103 | O | Unacceptable | X | X | O |
| A1 | Invention Example | 0.10 | 50 | 1.13 | 99 | O | Acceptable | O | O | O |
| A2 | Invention Example | 0.82 | 112 | 0.51 | 90 | O | Acceptable | O | O | O |
| A3 | Invention Example | 1.49 | 223 | 0.03 | 91 | O | Acceptable | O | O | O |
| A4 | Invention Example | 1.94 | 495 | 2.00 | 108 | O | Acceptable | O | O | O |
| A5 | Invention Example | 2.00 | 258 | 1.01 | 102 | O | Acceptable | O | O | O |
| A6 | Invention Example | 2.99 | 478 | 1.89 | 101 | O | Acceptable | O | O | O |
| A7 | Invention Example | 0.52 | 322 | 1.75 | 95 | O | Acceptable | O | O | O |
| A8 | Invention Example | 1.22 | 403 | 1.11 | 102 | O | Acceptable | O | O | O |
| A9 | Invention Example | 1.77 | 385 | 1.33 | 103 | O | Acceptable | O | O | O |
| C1 | Comparative Example | 3.33 | 50 | 2.27 | 108 | O | Unacceptable | X | X | O |
| C2 | Comparative Example | 4.53 | 9 | 1.58 | 112 | X | Unacceptable | O | X | O |
| C3 | Comparative Example | 4.58 | 75 | 1.69 | 100 | O | Unacceptable | O | X | O |
| C4 | Comparative Example | 5.22 | 98 | 0.03 | 98 | O | Unacceptable | O | X | O |
| C5 | Comparative Example | 5.75 | 350 | 3.05 | 115 | O | Unacceptable | X | X | O |
| C6 | Comparative Example | 6.88 | 236 | 1.25 | 107 | O | Unacceptable | O | X | O |
| C7 | Comparative Example | 7.86 | 528 | 0.05 | 99 | O | Unacceptable | X | X | O |
| C8 | Comparative Example | 8.23 | 804 | 0.08 | 101 | O | Unacceptable | X | X | O |
| C9 | Comparative Example | 8.87 | 866 | 3.77 | 110 | O | Unacceptable | X | X | O |

The clear-coated stainless steel sheet was visually observed in each of a longitudinal direction and a width direction, and the clear-coated stainless steel sheet in which no whitening and no uneven gloss were confirmed in both directions was determined as acceptable and had good transparency. The clear-coated stainless steel sheet was visually observed in each of the longitudinal direction and the width direction, and the clear-coated stainless steel sheet in which whitening and uneven gloss were confirmed in at least one direction of the longitudinal direction or the width direction was determined as unacceptable and had poor transparency.

The clear-coated stainless steel sheet was visually observed in each of the longitudinal direction and the width direction, and the clear-coated stainless steel sheet in which no uneven gloss was observed in both directions was set as "O". The clear-coated stainless steel sheet was visually observed in each of the longitudinal direction and the width direction, and the clear-coated stainless steel sheet in which uneven gloss was observed in at least one direction of the longitudinal direction or the width direction was set as "X".

In Table 1, in a case where all of the corrosion resistance, transparency, and uneven gloss were acceptable, a comprehensive determination was "O", and in a case where at least one of the corrosion resistance, transparency, or uneven gloss was unacceptable, the comprehensive determination was "X".

From the results in Table 1, it was found that the clear-coated stainless steel sheets obtained in No. A1 to No. A9 had excellent corrosion resistance, transparency, and uneven gloss.

On the other hand, it was found that at least one of the corrosion resistance, transparency, or uneven gloss in each of the clear-coated stainless steel sheets obtained in No. B1 to No. B11 and No. C1 to No. C9 deteriorated.

Furthermore, the clear-coated stainless steel sheets shown in Table 1 were installed on the premises of a steel mill adjacent to the coast and were left for 3 months to evaluate the initial atmospheric corrosion resistance. As the clear-coated stainless steel sheet, a square steel sheet having a length of a side of 1 m was used. A case where initial rust did not occur even after being left for 3 months was evaluated as "O" and had good initial atmospheric corrosion resistance, and a case where initial rust occurred was evaluated as "X". The clear-coated stainless steel sheets of No. A1 to No. A9 had good initial atmospheric corrosion resistance.

INDUSTRIAL APPLICABILITY

Since the clear-coated stainless steel sheet of the present invention has excellent design properties and initial atmospheric corrosion resistance, the clear-coated stainless steel sheet is suitable for outdoor building materials such as roofing materials.

EXPLANATION OF REFERENCE SIGNS

10: clear-coated stainless steel sheet for automotive exhaust system part (clear-coated stainless steel sheet)
20: stainless steel sheet
30): clear-coated film

What is claimed is:

1. A clear-coated stainless steel sheet, comprising:
   a stainless steel sheet; and
   a clear-coated film formed on at least one surface of the stainless steel sheet and having an average film thickness of 0.05 µm or more and 3.00 µm or less,
   wherein a surface of the clear-coated film is an uneven surface,
   an interval between two adjacent protruding portions on the uneven surface is 100 µm or more and 500 µm or less, and
   a height difference between a protruding portion and a recessed portion adjacent to each other on the uneven surface is 2.00 µm or less.

2. The clear-coated stainless steel sheet according to claim 1, wherein a contact angle between a surface of the clear-coated film and pure water, a halide aqueous solution, or seawater is 90° or more.

3. The clear-coated stainless steel sheet according to claim 2, wherein the clear-coated film contains organic particles.

4. The clear-coated stainless steel sheet according to claim 1,
   wherein the clear-coated film contains organic particles.

* * * * *